United States Patent [19]

Tada et al.

[11] Patent Number: 4,814,991
[45] Date of Patent: Mar. 21, 1989

[54] CRUISE CONTROL SYSTEM FOR A VEHICLE

[75] Inventors: Tetsuya Tada; Masumi Nagasaka, both of Toyota; Tatsuo Teratani, Aichi, all of Japan

[73] Assignee: Toyota Jidosha Kabushiki Kaisha, Aichi, Japan

[21] Appl. No.: 70,244

[22] Filed: Jul. 6, 1987

[30] Foreign Application Priority Data

Jul. 17, 1986 [JP] Japan .................. 61-166802

[51] Int. Cl.$^4$ ............................................ B60K 31/00
[52] U.S. Cl. .............................. 364/426.04; 364/165; 364/431.07; 180/179; 123/352
[58] Field of Search .............. 364/426, 431.07, 431.04, 364/161, 162, 163, 165; 123/351, 352; 180/176, 177, 178, 179; 318/594, 64

[56] References Cited

U.S. PATENT DOCUMENTS

| | | | |
|---|---|---|---|
| 3,869,019 | 3/1975 | Cardani | 180/176 |
| 3,952,829 | 4/1976 | Gray | 123/352 X |
| 4,138,723 | 2/1979 | Nehmer et al. | 180/179 X |
| 4,169,437 | 10/1979 | Fleischer | 123/352 |
| 4,467,428 | 8/1984 | Caldwell | 364/426 |
| 4,591,986 | 5/1986 | Nakajima et al. | 364/431.07 X |
| 4,598,370 | 7/1986 | Nakajima et al. | 123/352 |
| 4,603,668 | 8/1986 | Ueno | 123/352 |
| 4,639,854 | 1/1987 | Kwokawa et al. | 318/611 X |
| 4,707,792 | 11/1987 | Naitou | 180/176 X |
| 4,723,213 | 2/1988 | Kawata et al. | 180/179 X |

Primary Examiner—Gary Chin
Attorney, Agent, or Firm—Parkhurst, Oliff & Berridge

[57] ABSTRACT

A cruise control system for a vehicle having an internal combustion engine provided with a throttle valve operated by a diaphragm actuator irrespective of a depression of an accelerator pedal by an operator of the vehicle. The system is provided with a system for controlling a vehicle speed in a so-called "dead zone" where hunting usually occurs if a normal feedback control is executed. A time-interval integrating unit is provided for integrating the deviation of the acutal speed with respect to the target speed with a time interval as well as a weight factor, so that the integrated value corresponds to the change in the deviation in the dead zone. The integrated value is compared with a predetermined value corresponding to a change in the vehicle speed which is obtainable when the least significant bit in the control signal output to the actuator is changed. When the integrated value becomes equal to or higher than the predetermined value, the least significant bit is incremented or decremented, and thus speed control in the "dead zone" becomes possible.

10 Claims, 7 Drawing Sheets

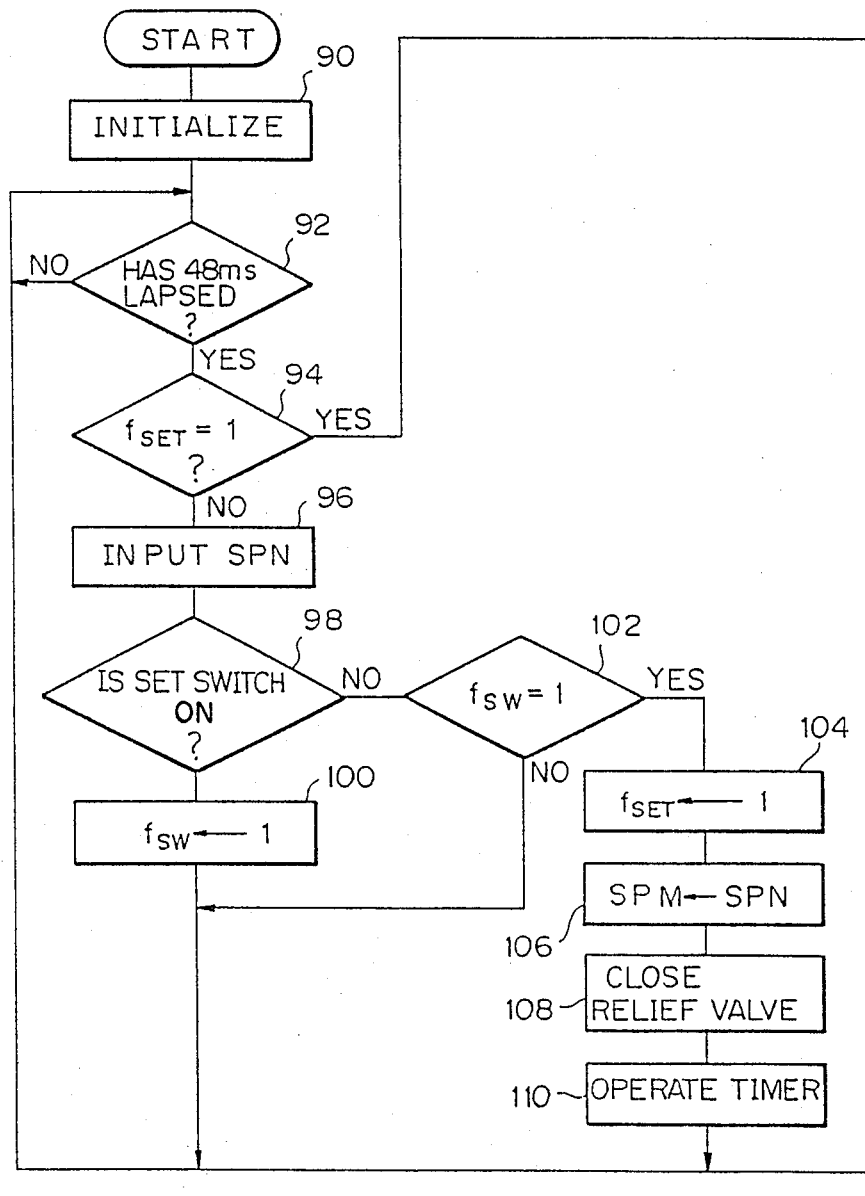

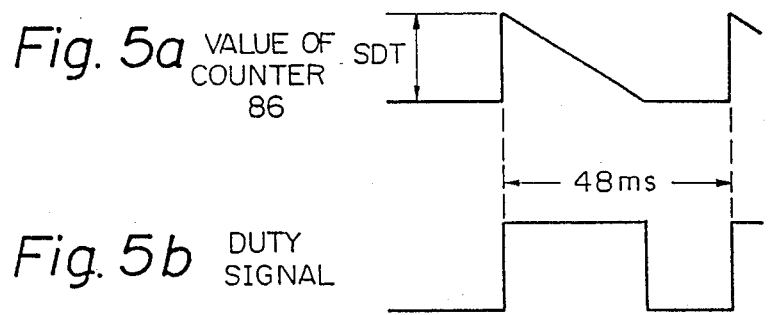
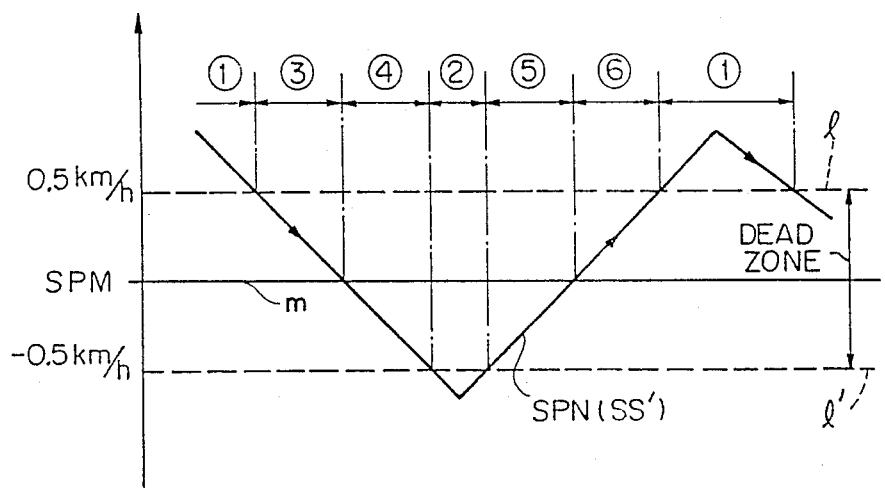

CRUISE CONTROL SYSTEM FOR A VEHICLE

BACKGROUND OF THE INVENTION

1. Field of the Invention

The present invention relates to a cruise control system for a vehicle whereby any deviation between actual vehicle speed and a target vehicle speed is controlled to a value as small as possible.

2. Description of the Related Art

Known in the prior art is a cruise control system for an automobile provided with an internal combustion engine, wherein the cruise control system has an actuator for operating an output control member of an engine, such as a throttle valve, in such a manner that the vehicle speed is controlled to a target value when the system is in a cruise mode. The cruise control system includes a sensor for detecting an actual speed of the vehicle, and means are provided for detecting a deviation of an actual vehicle speed from a target speed.

The known cruise control system has an inevitable "dead zone" where a deviation between the actual speed and the target speed is small; in this dead zone, the cruise control system does not function to eliminate the deviation. This is to prevent so-called hunting which would otherwise occur for the following reason if normal control were effected. The system is usually provided with a microcomputer system of 8 to 16 bits, and the cruise operation actuator is naturally operated by digital signals of such bits. Assuming a digital signal to the actuator is constructed of 8 bits, a number of states corresponding to 255 as indicated by a decimal number are obtained. If the output of the actuator to the control member of the throttle valve is changed between a minimum value 0 to a maximum value 100, then this value range of 0 to 100 is assigned to the 8 bit signal having 255 states. This means that the change in the value output to the actuator when the state of the least significant bit of the 8 bit signal is changed would be 100/255, which is equal to 0.39. In other words, the change in the value of the output signal to the actuator can not be smaller than 10/255=0.39, no matter how small the difference between the actual vehicle speed and the target vehicle speed. This means that, if a normal feedback control is effected at the zone having a small speed difference, the change in output value of the signal to the actuator becomes too high and hunting occurs.

SUMMARY OF THE INVENTION

An object of the present invention is to provide a cruise control system for a vehicle capable of speed control in the dead zone in which it is usually impossible to attain such speed control.

According to the present invention, a feedback control system is provided, comprising:
an actuator means for controlling a control variable;
means for issuing electric digital signals to the electric actuator means, each of which has a predetermined number of bits;
first detecting means for detecting an actual value of the control variable;
target value setting means for setting a target value of the control variable;
first timing means for setting a first timing for a normal feedback control operation;
feedback control means for controlling, in a normal feedback region, a state of a digital signal sent to said electric actuator means so that a deviation of the actual value of the control variable from the target value is reduced;
means for discriminating a zone having a small difference between the target value and the actual value where hunting is apt to occur if the normal feedback control is effected by the feedback control means; and
means for, in said zone, modifying the deviation value so that the modified value corresponds to a change in a control variable, and for controlling the lower bit(s) of said digital signal whereby a stable feedback control is effected in said dead zone.

BRIEF DESCRIPTION OF THE DRAWINGS

FIGS. 2, 2A, 2B, 3 and 4 are flowcharts of routines realized in the control circuit in FIG. 1;

FIGS. 5A and 5B show timing charts illustrating how the duty signal is obtained;

FIG. 6 illustrates various control areas which are assigned in accordance with a speed of the vehicle with respect to the target speed;

DESCRIPTION OF THE PREFERRED EMBODIMENTS

Figure 1:
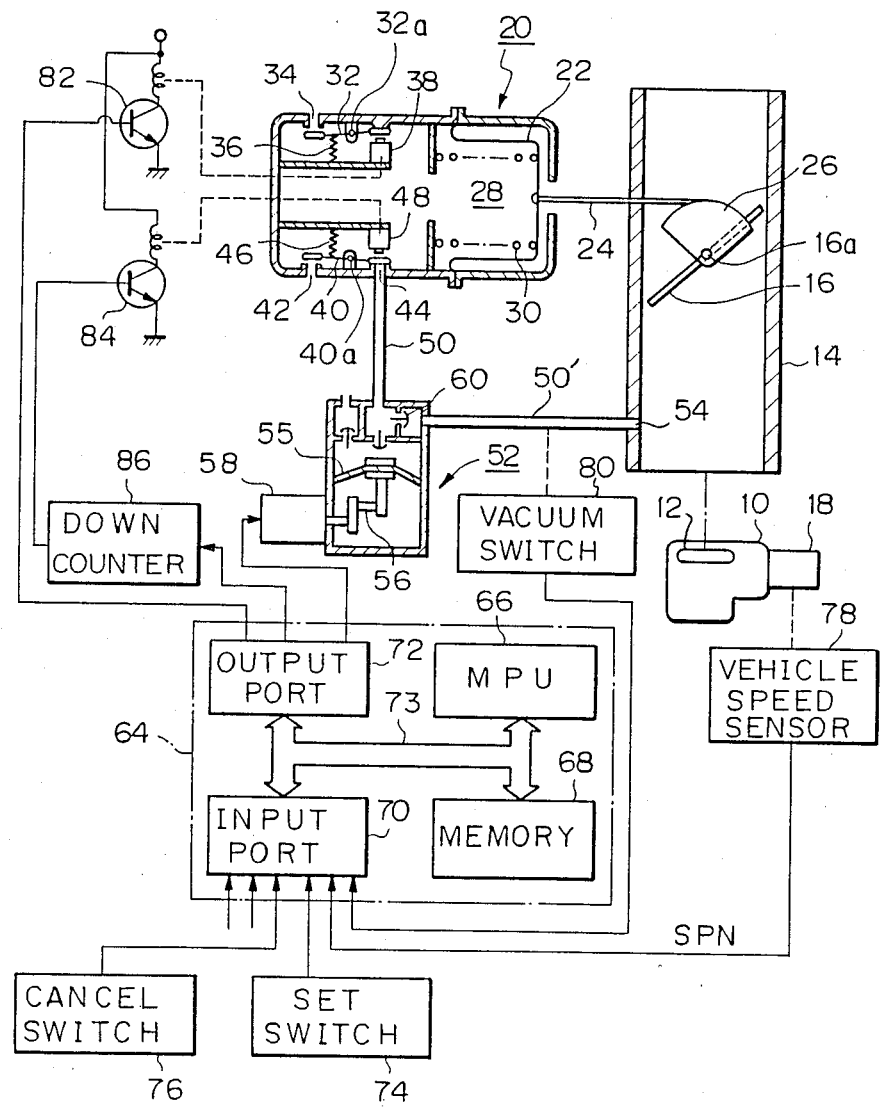
FIG. 1 is an overall schematic view of the cruise control system according to the present invention.

Referring to FIG. 1, 10 denotes an engine body, 12 an intake manifold, 14 an intake pipe connected to the intake manifold 12, 16 a throttle valve, and 18 a transmission device for connecting the crankshaft (not shown) of the engine body 10 to a propeller shaft (not shown).

Reference numeral 20 denotes an actuator which responds to electric signals for rotating the throttle valve 16 irrespective of the depression of an accelerator pedal (not shown) when the cruising apparatus is in a cruising mode. The actuator 20 is provided with a diaphragm 22 which is connected, via a connecting member 24 such as a cable, to a sector shaped lever 26 connected to a shaft 16a of the throttle valve 16. A vacuum force applied to the diaphram causes the connecting member 24 to be wound around the outer surface of the sector shaped lever, so that the throttle valve 16 is rotated. The shaft 16a of the throttle valve 16 is connected to an accelerator pedal (not shown) by a suitable and known connecting means for allowing a desired control of the degree of opening of the throttle valve in accordance with a depression of the accelerator pedal, when the cruising mode operation is cancelled. When the apparatus is in the cruising mode, the degree of opening of the throttle valve 16 is controlled by the actuator 20, as will be described fully later. The actuator 20 has a diaphragm chamber 28 on one side of the diaphragm 22 remote from the connecting member 24. A spring 30 is arranged in the diaphragm chamber 28 and urges the diaphragm 22 to move to the right in FIG. 1, so that the throttle valve 16 is closed. The actuator 20 is provided with a relief valve 32 which selectively opens or closes a relief port 34 opened to the atmosphere. A spring 36 is provided to urge the relief valve 32 so that the relief port 34 is normally open, in such a manner that the diaphragm chamber 28 is opened to the atmosphere. When a solenoid mechanism 38 is energized, the valve member 32 is rotated around an axis 32a against the force of the spring 36 so that the relief port 34 is closed by the valve member 32. This allows the vacuum pressure in the diaphragm chamber 28 to be controlled by a control valve 40. The control valve 40 selectively opens or closes an atmospheric air pressure port 42 or a vacuum pressure port 44. The control valve 40 is urged by a spring 46 in such a manner that the atmospheric air pressure port 42 is opened when the vacuum port 44 is closed. When a solenoid 48 is energized, the control valve 40 is rotated around an axis 40a against the force of the spring 46 so that the atmospheric air pressure port 42 is closed when the vacuum port 44 is opened. This allows the diaphragm chamber 28 to be under a vacuum pressure, causing the diaphragm 22 to be displaced to the left in FIG. 1 against the force of the spring 30. Thus, the degree of opening of the throttle valve 16 is controlled in accordance with a level of the vacuum pressure in the chamber 28. The vacuum chamber 28 is connected, via vacuum passageways 50 and 50', to a vacuum taking out port 54 in the intake pipe 14 of the engine. A vacuum pump 52 is arranged between the vacuum passageways 50 and 50' to generate a vacuum pressure for operating the vacuum actuator 20 when the vacuum pressure at the vacuum port 54 is weak. The vacuum pump 52 is provided with a diaphragm 55, and a crank mechanism 56 is connected to the diaphragm 55 to obtain a linear reciprocal movement of the diaphragm 55 from the rotational movement to the crank mechanism 56. The rotation of the rotary motor 58 causes a linear reciprocal movement of the diaphragm 55 and thus generates a vacuum in the vacuum passageway 50. When the vacuum pressure at the vacuum port 54 is strong, the rotary motor 58 is stopped, so that the vacuum passageway 50 is opened to the port 54 via a check valve 60. Thus, the passageway 50 is under a vacuum pressure which is equal to that of the vacuum port 54.

A control circuit 64 is provided for controlling the operation of the cruise control system according to the present invention, and is constructed as a microcomputer system. The control circuit 64 comprises, as basic elements, a microprocessing unit (MPU) 66 of 8 or 16 bits, a memory 68, an input port 70, an output port 72, and a bus 73 for connecting these elements. Various sensors and switches are connected to the input port 70 for realizing the cruise control according to the present invention. Among these sensors and switches, those closely related to the present invention will now be explained. A set switch 74 is manually operated by an operator to start the cruise mode, in such a way that this node is commenced when the switch 74 is moved from ON to OFF, i.e., when the switch 74 is once pushed and released. A cancel switch 76 is manually operated by an operator to cancel the cruise operation mode. A vehicle speed sensor 78 is connected to an output shaft of the transmission device 18 or to a rotational shaft of a vehicle speed meter for generating pulse signals as the shaft rotates. A vehicle speed SPN can be determined from the distance between the pulse signals. A vacuum switch 80 is provided to detect a predetermined vacuum level value at the vacuum port 54. The selective operation of the electric rotary motor 58 of the vacuum pump 52 is effected in accordance with signals from the vacuum switch 80.

The output port 72 is connected to a transistor 82 to operate the solenoid 38 for operating the relief valve 32, and to a transistor 84 to operate the solenoid 48 for operating the control valve 40. A down counter 86 is arranged between the output port 72 and the transistor 84 in order to control the duration of a pulse (duty ratio) in a pulse signal sent to the transistor 84 for operating the control valve 40. The vacuum pressure level in the diaphragm chamber 28 is controlled in accordance with the duty ratio, so that the degree of opening of the throttle valve 16 is controlled.

Figure 2B:
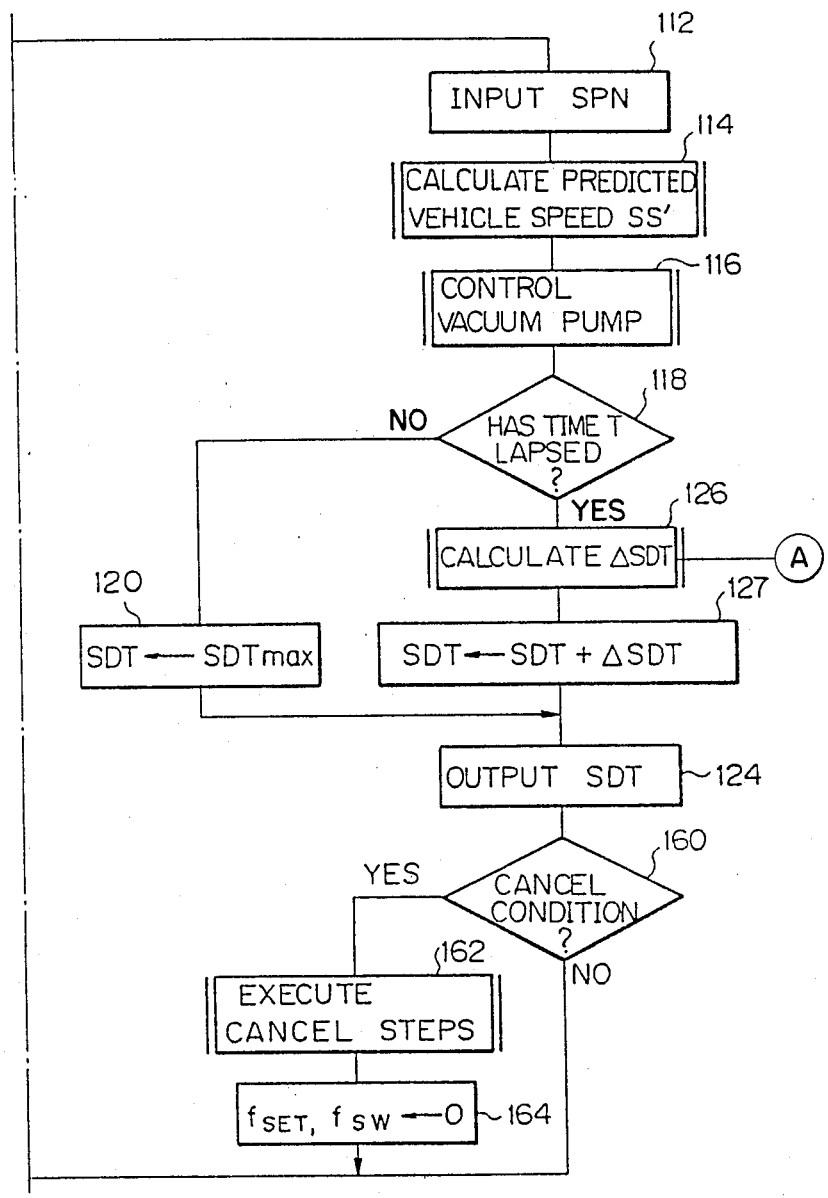

An operation of the control circuit 64 will be described with reference to flowcharts shown in FIGS. 2 to 4. In FIG. 2, when the routine is commenced, an initialization routine is executed at step 90, where the registers in the MPU 66, RAM area of the memory 68, input port 70, and output port 72, and the like, are initialized. At step 92 it is determined if a predetermined waiting time of 48 milliseconds has lapsed. In other words, the routine following step 92 is executed at a time interval of 48 milliseconds. At step 94 it is determined if a flag $f_{SET}$ is set. This flag is "0" when the vehicle is in the normal running mode, and is "1" when the vehicle is in the cruise mode. In the normal running mode, the routine goes from step 94 to step 96, where an actual value of the vehicle speed SPN, which is sensed by the vehicle speed sensor 78, is input. At step 98, it is determined if the set switch 74 is made ON. When the set switch 76 is ON, the routine goes to step 100, where a set switch flag $f_{SW}$ is set to "1". When the set switch 74 is OFF, the routine goes to step 102 where it is determined if flag $f_{SW}$ is "1". The moment of release of the set switch 74, which has been pushed, i.e., the moment at which the set switch 74 is switched from ON to OFF corresponds to a timing for a commencement of the cruise mode. In this case the routine goes from step 102 to step 104, where the flag $f_{SET}$ is set to "1". At the next step 106, the value of the actual vehicle speed SPN sensed by the sensor 78 is moved to a RAM area of the memory 68, to store the target value of the cruising speed SPM. At the following step 108, a high level signal is sent to the transistor 82 to turn it ON, so that the solenoid 38 is energized and makes the relief valve 32 take a position at which the relief port 34 is closed. As a result, the control of the degree of opening of the throttle valve 16 by control of the vacuum level in the diaphragm chamber 28 becomes possible. At the next step 110, a timer is started. This timer detects a predetermined time T after the commencement of the cruise operation, for controlling the speed of movement of the diaphragm 22 so that the diaphragm quickly reaches the position corresponding to the position of the throttle valve 16 where the vehicle has a speed near the target value SPM. In this embodiment of the present invention, T has a value of between 0.5 to 1 second in accordance with the value of target vehicle speed SPM.

When the flag $f_{SET}=1$, i.e., after the cruise mode has commenced, the routine goes from step 94 to step 112, where an actual vehicle speed SPN is input. Then, at step 114, a predicted vehicle speed SS' is calculated. The predicted vehicle speed SS' is an estimated vehicle speed at a time after a lapse of a predetermined short period from the present time, which is calculated from the present actual vehicle speed SPN, by using the following equation, $$SS' = SPN + Kv \times (SPN - SPNX),$$

where Kv is a constant, and SPNX is an actual vehicle speed obtained at the preceding cycle. By using this predicted vehicle speed SS', a stable control can be attained irrespective of any delay in the system for controlling the vehicle speed.

At step 116, a control of the vacuum pump 52 is realized. This includes operating the rotary motor 58 when it is determined from the condition of the vacuum switch 80 that the vacuum level at the vacuum port 54 is not sufficient to operate the actuator 20. When the vacuum level at the port 54 sensed by the vacuum switch 80 is high enough to operate the vacuum actuator 20, the rotary pump 58 is stopped.

At step 118, it is determined if a time T, which is selected from a range of between 0.5 to 1 second, has lapsed from the commencement of the cruise mode. If at the initial stage, the result of the judgement at step 118 is "no", then the routine goes from step 118 to step 120, where a predetermined maximum duty ratio value, $SDT_{max}$ is moved to SDT to store the duty ratio data in the signal for operating the control valve 40. The selection of the maximum value of the duty ratio allows the diaphragm 22 to quickly move to a position corresponding to a position of the throttle value 16 at which the target value of the vehicle speed SPM is obtained. At the next step 124, the SDT value is output and set to the down counter 86, and the down counter 86 commences the count-down. As will be seen from FIGS. 5a and 5b, during the count-down the down-counter 86 outputs a high level signal, i.e., "1" signal. After the count-down of the SDT value is complete, the down-counter 86 outputs a low level signal, i.e., "0" signal. In other words, the duration time of the "1" signal from the down-counter 86 in relation to the time interval for realizing the routine of FIG. 2 of 48 milliseconds corresponds to the duty ratio SDT. As a result, the transistor 84 is turned ON for a time period which corresponds to the calculated duty ratio SDT. Therefore, the control valve 40 opens the vacuum port 44 for a period corresponding to the duty ratio SDT, and the diaphragm chamber 28 is open to the vacuum source 54 or 52 for a period corresponding to the duty ratio SDT. As a result, the diaphragm chamber 28 is under a pressure which corresponds to the duty ratio SDT. Thus, the diaphragm 22 position corresponds to the calculated duty ratio SDT.

As described above, before the elapse of time T from the commencement of the cruise mode, the duty ratio SDT is set to the maximum value $SDT_{max}$, so that the speed of increase in the vacuum pressure in the diaphragm chamber 28 becomes high enough to allow the diaphragm 22 to move quickly to the left in FIG. 1 to the position at which the throttle valve 16 has an opening which will realize the target speed SPM.

When the time T has elapsed at step 118 of FIG. 2, the routine goes to step 126, where a feedback correction amount $\Delta SDT$ of the duty ratio is calculated and then, at step 127, the duty ratio SDT is calculated as a sum of the SDT value now stored, i.e., the duty ratio at the preceding cycle, and the feedback correction amount $\Delta SDT$.

Figure 3:
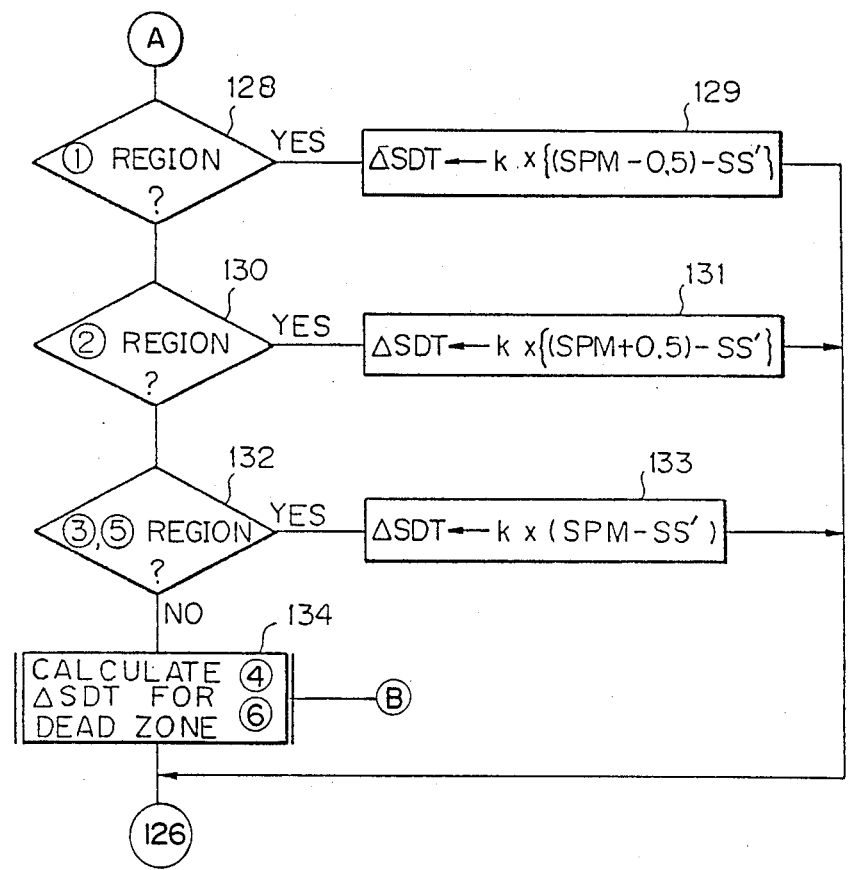

FIG. 3 illustrates in detail the routines carried out at step 126 in FIG. 2. At steps 128, 130, and 132, one particular range of the vehicle speed engine now located is detected from a plurality of regions in the vehicle speed designated by ① to ⑥ along the coordinate (time). FIG. 6 shows the change in vehicle speed SPN or SS' in relation to the target vehicle speed SPM (line m) when the system is in the cruise mode. A dotted line 1 corresponds to a vehicle speed of the target value SPM plus, for example, 0.5 km/h, while a dotted line 1' corresponds to a vehicle speed of the target value SPM minus, for example, 0.5 km/h. A space formed between the lines 1 and 1' astride the target speed line m is a so called "dead zone" where hunting is apt to occur if a normal feedback cruise control is carried out. In FIG. 6, the region ① corresponds to an area of vehicle speed higher than the upper limit line 1, the region ② corresponds to an area of vehicle speed lower than the lower limit line 1', and the region ③ corresponds to an area of vehicle speed where it is decreased toward the target value m after the line 1 has been passed in the dead zone. Region ④ is an area of actual vehicle speed where it is decreased toward the lower limit 1' after the target line m has been passed in the dead zone, region ⑤ is a range of vehicle speed where it is increased toward the target line m after the lower limit 1' has been passed in the dead zone, and region ⑥ is a range of vehicle speed where it is increased toward the upper limit line 1 after the target line m has been passed in the dead zone. When it is determined at step 128 of FIG. 3 that the vehicle speed is in the range of ① in FIG. 6, the routine goes to step 129, where the duty ratio correction amount $\Delta SDT$ is calculated by, $$\Delta SDT = k \times ((SPM - 0.5) - SS') \quad (1),$$

where k is the feedback gain. When it is determined at step 130 of FIG. 3 that the vehicle speed is in the range of ② of FIG. 6, the routine goes to step 131, where the duty ratio correction amount $\Delta SDT$ is calculated by, $$\Delta SDT = k \times ((SPM + 0.5) - SS') \quad (2).$$

In the above equation (1), it will be easily seen that the target value SPM is modified to SPM−0.5 in the range ① where the vehicle speed is decreasing toward the target value SPM out of the dead zone. This is to increase the speed of control of the vehicle speed to the target speed by increasing the value of the control deviation as a difference between the actual speed value SPN and the target speed value SPM. In a similar manner, the target value SPM is modified to SPM+0.5 in the range ② where the vehicle speed is increasing toward the target value SPM out of the dead zone. This is also to increase the speed of control of the vehicle speed toward the target value by increasing the value of the control deviation as a difference between the actual speed value SPN and the target speed value SPM. As will be clear from the above, by modifying the target speed in the actual speed range out of the dead zone, the speed of control of the engine speed to the speed in the b-line zone can be increased.

Figure 7:
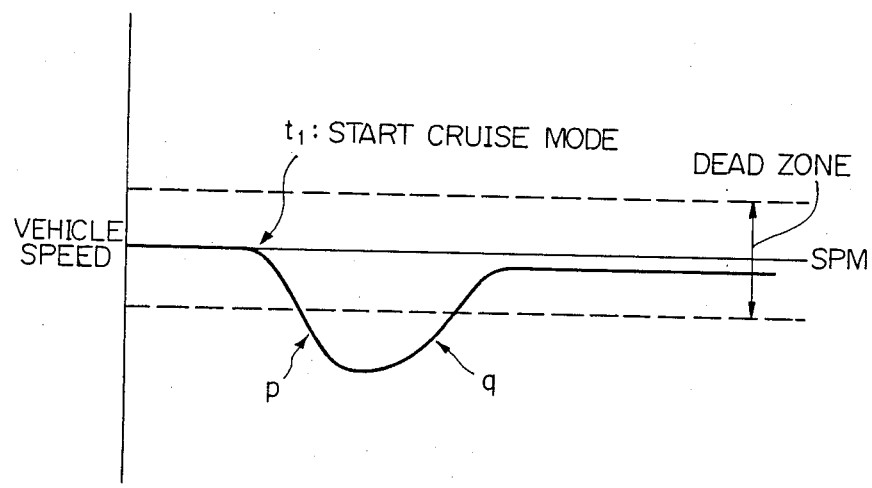
FIG. 7 shows a relationship between a time lapse after the commencement of the cruise mode and the vehicle speed; and, FIGS. 8a and 8b schematically illustrate the change in vehicle speed and a time integrated deviation value, respectively, in the dead zone.

FIG. 7 schematically shows a change in vehicle speed. When the cruise mode operation is commenced at time $t_1$, the engine speed is temporarily decreased as shown by p, due to the delay in response of the diaphragm 22 of the actuator 20, so that the vehicle speed may be outside the dead zone below the line 1, i.e., goes into the region ②. In this case, the target value is increased to SPM+0.5 from SPM, causing the feedback correction amount $\Delta SDT$ to be increased, so that the vehicle speed can be quickly increased to the target value SPM as shown by a line q in FIG. 7. Substantially the same situation will occur when the engine speed is outside the dead zone above the line 1, i.e., goes into the region ①. In this case, the target value is decreased to SPM−0.5 from SPM, causing the feedback correction amount ΔSDT to be increased so that the vehicle speed can be quickly decreased to the target value SPM.

When the vehicle speed is in a range ④ or ⑥ in the dead zone, the routine in FIG. 3 goes to step 134, where a calculation of ΔSDT for the dead zone is carried out. Note, the areas designated by ④ and ⑥ are located in the dead zone. When the vehicle speed is decreaased from the region ①, it is usually moved directly into the region ④ without staying in the region ③. When the vehicle speed is increased from the region ②, the vehicle speed is also usually moved directly into the region ⑥ without staying in the region ⑤. Therefore, in this embodiment, when the actual vehicle speed SPN is in the range ③ or ⑤, the routine goes to step 132, where the feedback correction amount is calculated by $$\Delta SDT = k \times (SPM - SS'),$$

which is a normal equation for calculating a feedback correction amount. In other words, in this embodiment, the control in the dead zone according to the present invention is only carried out at the region ④ or ⑥.

Figure 4:
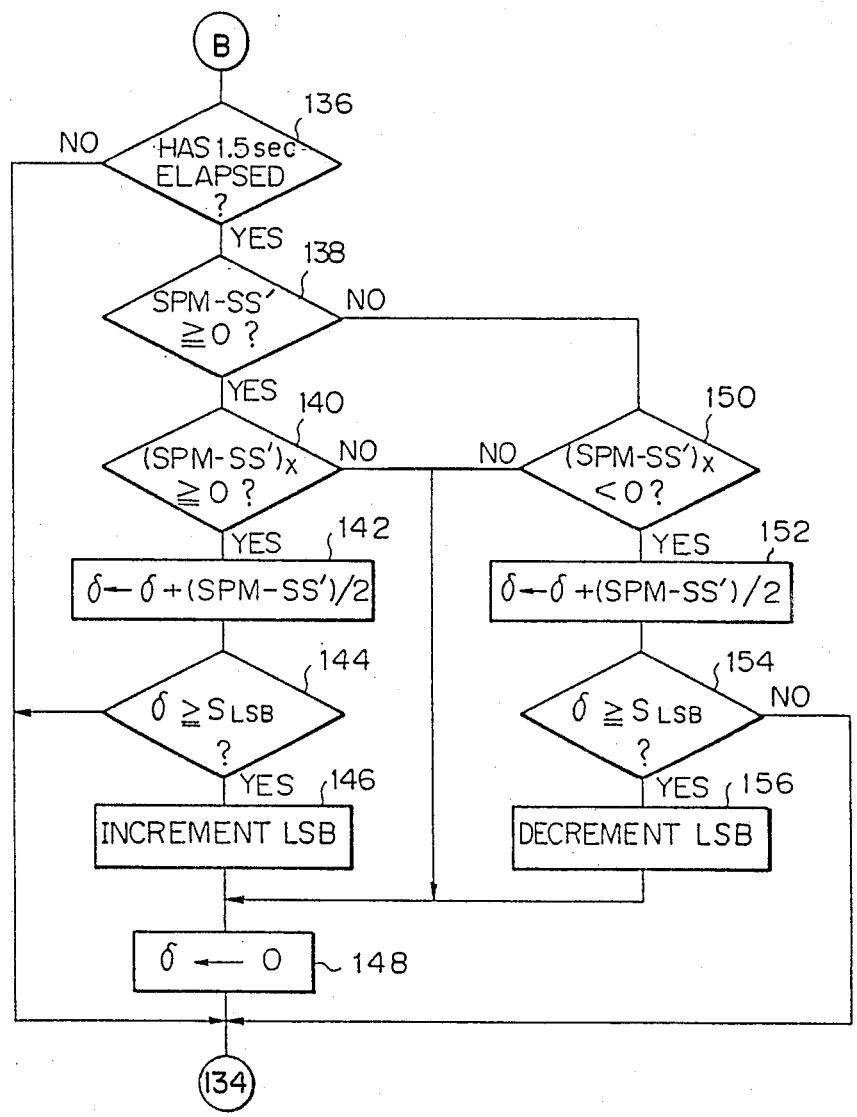

FIG. 4 shows details of the routine executed at step 134 in FIG. 3. At step 136, it is determined if a predetermined period, such as 1.5 seconds, has lapsed from the execution of the routines following step 138 in the preceding cycle. When the time has not yet lapsed, the routines following step 136 are by-passed. In other words, the routines from step 138 are executed at a time interval of 1.5 seconds, which is very much longer than the time interval of 48 milliseconds for the main routine. At point 138, it is determined if the value of the deviation as a difference between the target speed SPM and predicted vehicle speed SS' in this cycle (SPM−SS') is larger than or equal to zero, i.e., the vehicle speed is in the range ④. When the vehicle speed is in the range ④, the routine goes from step 138 to step 140, where it is determined if the value of the difference between the target speed SPM and predicted vehicle speed SS' in the preceding cycle (SPM−SS')$_x$ is larger than or equal to zero, i.e., the vehicle speed is also in the range ④ in the preceding cycle. When the vehicle speed is located in the region ④ in the consecutive cycles, the routine goes to step 142, where an integrated deviation value δ is calculated by $$\delta = \delta + (SPM - SS')/2,$$

where SPM−SS' denotes a deviation between the target speed and the actual speed, and ½ is a weight factor. The duration time for executing the integration step 142, that is 1.5 seconds, and the value of the weight factor, are suitably selected so that the value of δ corresponds to a value of deviation in the dead zone. In other words, the deviation value as calculated, SPM−SS', is multiplied by the weight factor which is smaller than 1.0, and is integrated at the time interval which is determined so that the value of δ corresponds to a change in vehicle speed in the dead zone. When this value δ becomes equal to the value corresponding to a vehicle speed change obtained when the least significant bit of the signal is sent from the output port 72 to the control system, i.e., the down-counter 86, for operating the actuator 20, is changed. It should be noted that, in order to attain a close control of the vehicle speed to the target speed, the integration spacing should be as short as possible. However, when the integration time interval becomes shorter, the weight value must be larger, and thus the integrated value is always nullified, since every bit, including the LSB, becomes "0", i.e., no digital signal can have a value lower than a predetermined value, so that detection of the deviation in a dead zone becomes impossible. Thus, the integration interval and the value of the weight factor should be selected so that the integration value δ corresponds to the deviation in the dead zone.

At step 144 it is determined if the value of the integrated deviation δ is larger than or equal to the value $S_{LSB}$ corresponding to a change in vehicle speed, for example, 1 km/h, which is obtained when the least significant bit in the data of the duty ratio correction value ΔSDT is changed. When the result at step 144 is "yes", the routine geos to step 146, where the least significant bit in the data of the duty ratio correction value ΔSDT is incremented by 1. At step 148, the integrated deviation value δ is cleared.

When the vehicle speed is in the region ⑥ in the dead zone of FIG. 6, the routine goes from step 138 to step 150, where it is determined if the value of the difference between the target speed and predicted vehicle speed in the preceding cycle, (SPM−SS')$_x$ is smaller than zero, i.e., the vehicle speed is also in the range ⑥ in the preceding cycle. When the vehicle speed is located in the region ⑥ in consecutive cycles, the routine goes to step 152, where an integrated deviation value δ is calculated, and then to step 154, where it is determined if the integrated deviation value δ is larger than or equal to the value $S_{LSB}$ corresponding to a vehicle speed change obtained when the least significant bit has been changed. When the result at step 154 is "yes", the routine goes to step 156, where the least significant bit in the data of the duty ratio correction value ΔSDT is decremented by 1.

It should be noted that when the vehicle speed is outside the dead zone, then the routine goes from step 140 or 150 to step 148, to clear the integrated deviation value δ.

Figure 8A:
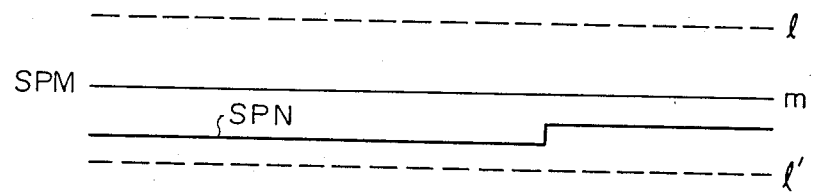
Figure 8B:
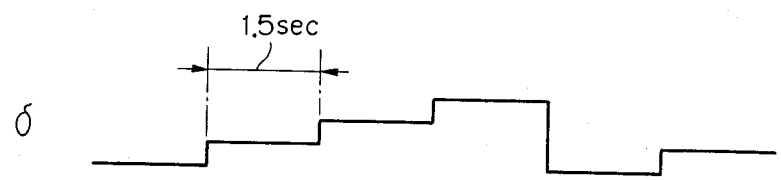

FIG. 8 shows how the speed control in the dead zone according to the present invention is carried out. When the vehicle speed falls into the dead zone between lines l and l', the calculation of the integrated deviation value δ is carried out at the time interval of 1.5 seconds. When the integrated deviation amount δ as the deviation in the dead zone becomes larger than the value corresponding to the change in the vehicle speed obtained when the least significant bit is changed, the least significant bit is changed in the data of the feedback correction amount ΔSDT, which determines the duty ratio in the signal for operating the actuator 20. At the same time, the integrated value δ is cleared, and the above-mentioned control is repeated when the vehicle speed is in the dead zone. As a result, a close control of the vehicle speed in the dead zone is realized.

It should be noted that, at step 160 in FIG. 2, it is determined if a cancel condition is in force. When the cruise mode is cancelled by, for example, turning the cancel switch 76 ON or by a depression of a brake pedal (not shown), the routine goes from step 160 to step 162, where cancel steps are executed, i.e., the relief valve 32 and the control valve 40 open the atmospheric air ports 34 and 42, respectively, which causes the pressure of the diaphragm chamber 28 to be atmospheric pressure, and thus moves the diaphragm 22 to the far left in FIG. 1. At step 164, flags $f_{SET}$ and $f_{SW}$ are reset.

Although the invention has been described with reference to the attached drawings, many modifications and changes can be made by those skilled in this art without departing from the scope and spirit of the present invention.

We claim:

1. A feedback control system comprising:
   actuator means for controlling a control variable;
   means for outputting digital electric signals to the actuator means, each of said digital electric signals having a predetermined number of bits;
   first detecting means for detecting an actual value of the control variable;
   target value setting means for setting a target value of the control variable;
   first timing means for setting a first predetermined time interval for executing a normal feedback control of the control variable;
   first feedback control means, operative at said first predetermined time interval, for controlling said digital electric signals in accordance with a normal feedback control strategy, so that a deviation between the actual value of the control variable and the target value of the control variable is reduced;
   second detecting means for detecting a dead zone wherein a predetermined small difference exists between the target and actual values of the control variable, where hunting is apt to occur if the normal feedback control strategy is effected by the first feedback control means; and
   second feedback control means, operative upon detection of said dead zone by said second detecting means, for controlling said digital electric signals in accordance with a modified feedback control strategy wherein a deviation between the target and actual values of the control variable is integrated and said integrated deviation is reduced if it is greater than or equal to a minimum change of the control variable obtainable by a change in said digital electric signals, so that a fine control of the control variable is achieved in said dead zone.

2. A system according to claim 1, wherein said second feedback control means comprises:
   second timing means for setting a predetermined time interval larger than said first predetermined time interval;
   means for integrating the deviation at the second predetermined time interval together with a weight factor, values of said second predetermined time interval and said weight factor being determined in such a manner that the integrated deviation becomes an actual deviation in said dead zone; and
   comparing means for controlling the value of a least significant bit of said digital electric signals by comparing the integrated deviation with a predetermined value corresponding to a change of the control variable obtainable when the least significant bit of the digital electric signals is changed.

3. A cruise control system, for a vehicle having an internal combustion engine and a power unit for controlling an output of said engine, comprising:
   actuator means connected to said power unit for controlling engine output;
   means for outputting digital electric signals to the actuator means, each of said digital electric signals having a predetermined number of bits;
   first detecting means for detecting an actual value of the vehicle speed;
   target value setting means for setting a target value of the vehicle speed to be maintained by said cruise control system;
   first timing means for setting a first predetermined time interval for executing a normal feedback control of the vehicle speed;
   first feedback control means, operative at said first predetermined time interval, for controlling said digital electric signals in accordance with a normal feedback control strategy, so that a deviation between the actual value of the vehicle speed and the target value of the vehicle speed is reduced;
   second detecting means for detecting a dead zone wherein a predetermined small difference exists between the target and actual values of the vehicle speed, where hunting is apt to occur if the normal feedback control strategy is effected by the first feedback control means; and
   second feedback control means, operative upon detection of said dead zone by said second detecting means, for controlling said digital electric signals in accordance with a modified feedback control strategy wherein a deviation between the target and actual values of the vehicle speed is integrated and said integrated deviation is reduced if it is greater than or equal to a minimum change of the vehicle speed obtainable by a change in said digital electric signals, so that a fine control of the vehicle speed is achieved in said dead zone.

4. A system according to claim 3, wherein said second feedback control means comprises:
   second timing means for setting a second predetermined time interval larger than said first predetermined time interval;
   means for integrating the deviation at said second predetermined time interval together with a weight factor, values of said second predetermined time interval and said weight factor being determined in such a manner that the integrated deviation corresponds to an actual deviation in said dead zone; and
   comparing means for controlling the value of a least significant bit of said digital electric signals by comparing the integrated deviation with a predetermined value corresponding to a change of the vehicle speed obtainable when the least significant bit of the digital electric signals is changed.

5. A system according to claim 3, wherein said internal combustion engine is a gasoline engine, and said power unit comprises a throttle valve.

6. A system according to claim 5, wherein said actuator means comprises a vacuum actuator connected to the throttle valve for independent control of an opening of the throttle valve, and vacuum control means, responsive to said digital electric signals, for controlling a vacuum level in said vacuum actuator.

7. A system according to claim 6, wherein said vacuum control means comprises valve means for controlling air introduced into the vacuum actuator, and means responsive to said digital electric signals for controlling the valve means.

8. A system according to claim 4, wherein said integrating means integrates the deviation only after the actual value of the vehicle speed has overshot the target value of the vehicle speed.

9. A system according to claim 3, wherein the actual value of the vehicle speed utilized for calculating the deviation is a predicted vehicle speed which is estimated, from the actual value of the vehicle speed, after a lapse of a predetermined time period.

10. A system according to claim 4, further comprising means for modifying the target value of the vehicle speed during control by said first feedback control means.

* * * * *